United States Patent [19]

Chizat et al.

[11] Patent Number: 5,446,087
[45] Date of Patent: Aug. 29, 1995

[54] CURABLE RELEASE COMPOSITIONS COMPRISING NOVEL SILICONE ADHESION MODIFIER

[75] Inventors: Francois Chizat, Bron; Andre Soldat, Lyons, both of France

[73] Assignee: Rhone-Poulenc Chimie, Courbevoie Cedex, France

[21] Appl. No.: 161,467

[22] Filed: Dec. 6, 1993

[30] Foreign Application Priority Data

Dec. 4, 1992 [FR] France ................. 92 14620

[51] Int. Cl.$^6$ .............................................. C08L 83/04
[52] U.S. Cl. .................... 524/588; 524/464; 524/837; 524/862; 525/478; 525/479; 528/15
[58] Field of Search ............... 528/15; 524/588, 464, 524/837, 862; 525/478, 479

[56] References Cited

U.S. PATENT DOCUMENTS

| | | | |
|---|---|---|---|
| 4,529,789 | 7/1985 | Kroupa | 525/478 |
| 4,623,700 | 11/1986 | Traver et al. | 525/478 |
| 5,134,203 | 7/1992 | Hockemeyer et al. | 528/15 |
| 5,164,461 | 11/1992 | Mitchell et al. | 525/478 |
| 5,169,727 | 12/1992 | Boardman | 525/478 |
| 5,204,435 | 4/1993 | Kozakai et al. | 528/15 |
| 5,292,586 | 3/1994 | Lin | 525/478 |

FOREIGN PATENT DOCUMENTS

| | | |
|---|---|---|
| 0053471 | 6/1982 | European Pat. Off. . |
| 0108208 | 5/1984 | European Pat. Off. . |
| 0219720 | 4/1987 | European Pat. Off. . |

*Primary Examiner*—Melvyn I. Marquis
*Attorney, Agent, or Firm*—Burns, Doane, Swecker & Mathis

[57] ABSTRACT

Unique silicone adhesion modifiers well suited for formulation into curable release compositions containing a linear polydiorganosiloxane, comprise an organopolysiloxane resin (A) containing at least 0.1 mol % of alkenyl or alkenyloxyalkylene radicals directly bonded to silicon atoms, an organopolysiloxane resin (B) containing at least 0.5 mol % of hydrogen atoms directly bonded to silicon atoms, and a solvent/diluent (C) for the resins (A) and (B).

7 Claims, No Drawings

CURABLE RELEASE COMPOSITIONS COMPRISING NOVEL SILICONE ADHESION MODIFIER

BACKGROUND OF THE INVENTION

1. Field of the Invention

The present invention relates to a unique silicone adhesion modifier system and to the formulation thereof into curable silicone compositions which can be applied to a wide variety of substrates to facilitate the removal ("release") of adhesive materials therefrom.

2. Description of the Prior Art

It is known to this art (French Patent No. 2,450,642) to formulate solutions of a vinylpolysiloxane resin in a vinylated silicone oil, to which a methylhydropolysiloxane crosslinker which is soluble in the resin solutions, an inhibitor and a poly addition catalyst have been added, for coating substrates such as paper, thin aluminum sheets, etc. This permits the controlled detachment, from said substrates, of pressure-sensitive adhesive materials such as acrylic adhesives. This type of composition presents the disadvantage of being only moderately effective with other adhesives, in particular those of the styrene/butadiene rubber type.

It is also known (U.S. Pat. No. 3,772,247) to treat paper substrates using compositions containing organohydropolysiloxane resins as adhesion modifiers, to permit the controlled detachment of rubber-based adhesives. Such compositions perform poorly with acrylic adhesives.

SUMMARY OF THE INVENTION

Accordingly, a major object of the present invention is the provision of novel silicone adhesion modifier systems which are useful for the preparation of curable compositions permitting the controlled detachment of any type of adhesive, acrylic or rubber, from a wide variety of substrates (paper, glass, plastic, metal, etc.). Moreover, the composite (laminate) formed by the substrate coated with the cured silicone composition and the adhesive system exhibits an excellent stability in respect of its adhesiveness performance over time (stability of release performance).

Briefly, the present invention features an adhesion modifier system comprising:

(A) 30 to 70 parts, preferably 40 to 60 parts, by weight of at least one organopolysiloxane resin which is solid in the dry state, which comprises at least two different types of siloxy structural units $R_3SiO_{1/2}$ (M unit) and $SiO_2$ (Q unit) and/or $RSiO_{3/2}$ (T unit), and optionally of $R_2SiO$ structural units (D unit), in which the radicals R, which may be identical or different, are each a $C_1$–$C_{18}$ alkyl or cycloalkyl radical, a $C_2$–$C_{20}$, preferably $C_2$–$C_{20}$, alkenyl radical, or a ($C_3$–$C_9$ alkenyl)oxyalkylene($C_2$–$C_4$) radical, at least 80 mol % of the radicals R being methyl radicals, and said resin containing at least 0.1 mol %, preferably from 0.5% to 5 mol %, of said identical or different alkenyl or alkenyloxyalkylene radicals bonded to silicon ("Si-alkenyl"), with a ratio of the number of (M) units/number of (Q) and/or (T) units ranging from 0.6 to 1, and the number of optional (D) units, when present, ranging from 0.5 to 10 per 100 moles of resin;

(B) 70 to 30 parts, preferably 60 to 40 parts, by weight of at least one organopolysiloxane resin which is solid in the dry state, which comprises at least two different types of siloxy structural units $R'_3SiO_{1/2}$ (M unit) and $SiO_2$ (Q unit) and/or $R'SiO_{3/2}$ (T unit), and optionally of $R'_2SiO$ structural units (D unit), in which the radicals R', which may be identical or different, are each hydrogen or a radical R, at least 80 mol % of the radicals R' being methyl radicals, and said resin containing at least 0.5 mol %, preferably 0.5 to 5 mol % of hydrogen atoms bonded directly to silicon ("SiH"), with a ratio of the number of (M) units/number of (Q) and/or (T) units ranging from 0.6 to 1, and the number of optional (D) units, when present, ranging from 0.5 to 10 per 100 moles of resin; with the proviso that said resins (A) and (B) contain less than 10 mol %, preferably less than 0.5 mol % and more preferably less than 0.3 mol %, of silanol functional groups; and (C) at least one solvent or at least one diluent for the mixture of resins (A) and (B).

DETAILED DESCRIPTION OF BEST MODE AND PREFERRED EMBODIMENTS OF THE INVENTION

More particularly according to the present invention, the subject resins containing "Si-alkenyl" functional groups (A), especially the vinylated resins, are well known to this art; the alkenyl or alkenyloxy radicals may be borne by the (M), (D) or (T) units. Same may be prepared, for example, according to the process described in U.S. Pat. No. 2,676,182. A known treatment, using a silazane, permits decreasing the proportion of remaining silanol functional groups to less than 0.3% by weight, this to prevent interfering condensation reactions.

A certain number of these resins are commercially available, in most cases in the form of solutions, for example at a concentration of 40% to 70% in a solvent such as toluene or xylene.

The following solid resins are exemplary:

MD$^{Vi}$Q wherein the vinyl groups are included in the (D) units;

MM$^{Vi}$Q wherein the vinyl groups are included in a proportion of the (M) units;

MD$^{Vi}$T wherein the vinyl groups are included in the (D) units;

MM$^{Hexenyl}$Q wherein the hexenyl groups are included in a proportion of the (M) units;

MM$^{Allyloxypropyl}$Q wherein the allyloxypropyl groups are included in a proportion of the (M) units.

Resins containing "SiH" functional groups (B) are also well known to this art; they are described, in particular, in U.S. Pat. No. 3,772,247. The hydrogen atoms may be situated within the polymer chain or at the end(s) of a polymer chain. Certain of these resins are commercially available.

The following solid resins are exemplary of the latter:

MD'Q wherein the hydrogen atoms bonded to silicon are included in the (D) units;

MM'Q wherein the hydrogen atoms bonded to silicon are included in a proportion of the (M) units;

MM'DQ wherein the hydrogen atoms bonded to silicon are included in a proportion of the (M) units;

MDT' wherein the hydrogen atoms bonded to silicon are included in the (T) units.

Exemplary solvents or diluents (C) for the above solid resins include:

(1) conventional hydrocarbon solvents for silicone resins, solvents of aromatic (xylene, toluene, etc.) and saturated aliphatic (hexane, heptane, white spirit, tetrahydrofuran, diethyl ether, etc.) type, or chlorinated solvents (methylene chloride, perchloroethylene, etc.). These are generally employed in an amount corresponding to 50–70 parts by weight per 30–50 parts by weight of solid resins (A)+(B);

(2) the so-called "reactive" solvents such as (a) liquid organopolysiloxane resins in which the organic radicals are $C_1$–$C_{18}$ alkyl or cycloalkyl radicals, or $C_2$–$C_{20}$, preferably $C_2$–$C_{12}$, alkenyl radicals, which have a ratio of the number of (M) units/number of (Q) and/or (T) units on the order of 1 to 4 and optionally from 1 to 5 (D) units per 100 moles of liquid resin, and containing from 0.5% to 5 mol % of alkenyl functional groups bonded to silicon ("Si-alkenyl") or of hydrogen atoms bonded to silicon ("SiH"); these resins have a viscosity at 25° C. lower than 100 mPa.s, preferably on the order of 2 to 50 mPa.s. These liquid resins are also known materials, described, in particular, in U.S. Pat. No. 4,707,531 and European Application No. EP-A-389,138); and/or (b) fluid organopolysiloxane oils in which the organic radicals are $C_1$–$C_{18}$ alkyl or cycloalkyl radicals, $C_2$–$C_{20}$ alkenyl or ($C_3$–$C_9$ alkenyl)oxyalkylene($C_2$–$C_4$) radicals, oils containing from 0.2% to 5 mol % of alkenyl or alkenyloxyalkylene functional groups bonded to silicon, at the end(s) of a polymer chain or in the polymer chain, said oils having a viscosity lower than 200 mPa.s; and/or (c) hydrocarbons containing olefinic unsaturation(s), such as $C_{14}$–$C_{18}$ olefins, dibutyl maleate, decyl vinyl ether, dodecyl vinyl ether, camphene, meta-bisisopropenylbenzene, and the like (the so-called "reactive" solvents are generally employed in an amount corresponding to 20–50 parts by weight per 80–50 parts by weight of solid resins (A)+(B));

(3) aqueous emulsions of nonionic surface-active agents (polyvinyl alcohol, polyethoxylated alkylphenols, oxyethylenated ethers of fatty alcohols, and the like) generally containing on the order of 1% to 3% by weight of surface-active agent (these are generally used in a proportion of 40–70 parts by weight per 60–30 parts by weight of solid resins (A)+(B)).

The adhesion modifier system/formulation of the invention is conveniently prepared by mixing the constituents (A), (B) and (C) until the solid resins (A) and (B) are dissolved or diluted in the solvent or diluent (C).

The present invention also features curable release compositions which comprise:

(a) (100−x) parts by weight of a linear polydiorganosiloxane (D) blocked by triorganosiloxane end groups, said organic radicals being $C_1$–$C_{18}$ alkyl or cycloalkyl radicals, $C_2$–$C_{20}$, preferably $C_2$–$C_{12}$, alkenyl or ($C_3$–$C_9$ alkenyl)oxyalkylene($C_2$–$C_4$) radicals, at least 80 mol % of said radicals being methyl radicals, at least 0.1 mol %, preferably from 0.5 to 5 mol %, of said organic radicals, which may be identical or different, being alkenyl or alkenyloxyalkylene radicals bonded directly to silicon ("Si-alkenyl");

(b) x parts by weight of the modifier system based on the constituents (A), (B) and (C) described above, in which x advantageously ranges from 5 to 100, preferably from 5 to 95 and more preferably from 10 to 50;

(c) a hydrosilylation inhibitor;

(d) a linear polyorganohydrosiloxane crosslinking agent (E) containing from 1.6% to 0.9 mol % of hydrogen atoms bonded directly to silicon ("SiH") at the end(s) of the polymer chain and/or along the polymer chain, the organic radicals thereof, which may be identical or different, being $C_1$–$C_{18}$ alkyl radicals, at least 80 mol % of said organic radicals being methyl radicals, the amount of crosslinking agent being such that the ratio of the number of moles of "SiH" provided by the resin (B), from the "reactive" solvent (C) and from the crosslinking agent (E)/number of moles of "Si-alkenyl" provided by the resin (A), from the "reactive" solvent (C) and from the blocked linear polydiorganosiloxane (D) is greater than 1, preferably on the order of 1.1 to 1.6; and (e) a catalytically effective amount of a hydrosilylation catalyst.

The blocked linear polydiorganosiloxane containing "Si-alkenyl" functional groups (D) advantageously has a viscosity of at least 50 mPa.s, generally on the order of 150 to 1,000 mPa.s. It may contain trace amounts of nonlinear siloxane units (T) and/or (Q). The vinylated oils are commercial products typically employed for preparing curable release compositions (U.S. Pat. No. 4,623,700).

Oils containing heavier alkenyl or alkenyloxyalkylene radicals are especially described in EP-B-219,720 and EP-A-454,130.

The crosslinking agent containing "SiH" functional groups (E) advantageously has a viscosity lower than 200 mPa.s, preferably on the order of 5 to 150 mPa.s. Exemplary such crosslinking agents are described in U.S. Pat. No. 4,623,700 and European Patent No. EP-B-219,720.

Exemplary of the catalysts are the well-known derivatives and complexes of metals such as platinum, rhodium, ruthenium, etc., for example described in U.S. Pat. Nos. 3,159,601, 3,159,662, 3,220,972, 3,715,334, 3,775,452, 3,814,730, 3,296,291 and 3,928,629 and in French Patents Nos. FR-A-1,313,846 and 1,480,409. They are generally used in an amount on the order of 5 to 500 parts by weight, expressed as metal, per million of parts by weight of reactive silicone polymers.

The hydrosilylation inhibitor agent is present in an amount such that it inhibits the action of the catalyst at ambient temperature, this inhibiting action ceasing during the crosslinking treatment at elevated temperature. Such amount is generally on the order of 0.01 to 1 part by weight, preferably on the order of 0.1 to 0.25 part by weight per 100 parts of the total weight of silicone. Exemplary such inhibitors include the dialkyl dicarboxylates (U.S. Pat. Nos. 4,256,870 and 4,476,166); dialkyl acetylenedicarboxylates (U.S. Pat. No. 4,347,346); acetylenic alcohols (U.S. Pat. Nos. 3,989,866, 4,336,364 and 3,445,420), etc.

The subject curable release compositions are themselves conveniently prepared by mixing their various constituents; a few conditions for incorporation should be observed, namely, introduction of the hydrosilylation inhibitor prior to the crosslinking agent, with addition of the catalyst being the final step.

The curable compositions are fluid at normal temperature; their viscosity is generally on the order of 100 to 500 mPa.s at 25° C.

These compositions can be applied with the aid of devices employed on industrial paper-coating machines, such as a coating head with five rollers, systems with air blades, an equalizer bar, etc., to flexible substrates or materials, and then cured by transporting same through tunnel ovens heated to 70°–200° C. The time of travel in these ovens is a function of the temperature; it is generally on the order of 5 to 15 seconds at a temperature on the order of 100° C. and on the order of 1.5 to 3 seconds at a temperature on the order of 180° C.

The subject compositions can be deposited onto any flexible material or substrate such as papers of various types (supercalendered, coated, etc.), cardboards, cellulosic sheets, metal sheets, plastic films (polyester, polyethylene, polypropylene, etc.), and the like.

The amounts of compositions which are deposited are on the order of 0.5 to 2 g per m$^2$ of area to be treated, which corresponds to the deposition of layers having a thickness on the order of 0.5 to 2 μm.

The materials or substrates thus coated may be subsequently placed in contact with any pressure-sensitive rubber, acrylic or other adhesive materials. The adhesive material is then easily detachable from said substrate or material.

In order to further illustrate the present invention and the advantages thereof, the following specific examples are given, it being understood that same are intended only as illustrative and in nowise limitative.

EXAMPLES (1) Preparation of the modifier M$_1$ (comparative):
The following reagents were mixed:
  (a) a solution containing 50% by weight in xylene of a polymethylvinylsiloxane A containing:
    (i) 36 mol % of (M) structural units Me$_3$SiO$_{1/2}$,
    (ii) 6 mol % of (D$^{Vi}$) structural units MeViSiO,
    (iii) 58 mol % of (Q) structural units SiO$_2$, and
  (b) a polymethylvinylsiloxane oil C exhibiting a viscosity of 200 mPa.s at 25° C. and containing 1 mol % of SiVi functional groups in the form of Me$_2$ViSiO$_{1/2}$ and MeViSiO structural units, in proportions corresponding to an A/C weight ratio of 45/55 on a dry basis.

The xylene was removed under vacuum at 100° C.

After cooling to ambient temperature, 0.15 parts by weight of ethynylcyclohexanol were added per 100 parts by weight of silicone polymers.

The modifier M$_1$ thus obtained had a viscosity on the order of 3,000 mPa.s at 25° C.

(2) preparation of the modifier M$_2$ (comparative):
The following reagents were mixed:
  (a) a solution containing 30% by weight in toluene, of a polymethylhydrosiloxane resin B containing:
    (i) 39 mol % of (M) structural units Me$_3$SiO$_{1/2}$,
    (ii) 3.5 mol % of (D') structural units MeHSiO,
    (iii) 56.5 mol % of (Q) structural units SiO$_2$, and
  (b) the polydimethylvinylsiloxane oil C described above, in proportions corresponding to a B/C weight ratio of 45/55 on a dry basis.

The toluene was removed under vacuum at 100° C.

After cooling to ambient temperature, 0.15 parts by weight of ethynylcyclohexanol were added per 100 parts by weight of silicone polymers.

The modifier M$_2$ thus obtained had a viscosity on the order of 3,500 mPa.s at 25° C.

(3) Preparation of the modifier M$_3$:
The following reagents were mixed:
  (a) the solution of (MD$^{Vi}$Q) resin A described above, and
  (b) the solution of (MD'Q) resin B described above, in proportions corresponding to an A/B weight ratio of 50/50 on a dry basis.

The polydimethylvinylsiloxane C oil described above was added to this mixture in an amount such that the A+B/C weight ratio corresponded to 45/55 on a dry basis.

After removal of the xylene and toluene under vacuum at 100° C. and cooling to ambient temperature, 0.15 part by weight of ethynylcyclohexanol was added per 100 parts by weight of silicone polymers.

The modifier M$_3$ thus obtained had a viscosity on the order of 4,000 mPa.s at 25° C.

(4) Preparation of the modifier M$_4$ (comparative):
The following reagents were mixed:
  (a) the solution of (MD$^{Vi}$Q) resin A described above, and
  (b) a vinylpolyorganosiloxane fluid resin C' exhibiting a viscosity of 20 mPa.s at 25° C. and containing:
    (i) 51 mol % of Me$_3$SiO$_{1/2}$ structural units,
    (ii) 6 mol % of MeViSiO structural units,
    (iii) 38 mol % of SiO$_2$ structural units,
    (iv) 6 mol % of C$_2$H$_5$O$_{1/2}$ structural units, in proportions corresponding to an A/C' weight ratio of 45/55 on a dry basis.

After removal of the xylene and cooling, the modifier M$_4$ thus obtained had a viscosity of 980 mPa.s at 25° C.

(5) Preparation of the modifier M$_5$ (comparative):
The following reagents were mixed:
  (a) the solution of (MD'Q) resin B described above, and
  (b) the polymethylvinylsiloxane fluid resin C' described above, in proportions corresponding to a B/C' weight ratio of 45/55 on a dry basis.

After removal of the toluene and cooling, the modifier M$_5$ thus obtained had a viscosity of 1,050 mPa.s at 25° C.

(6) preparation of the modifier M$_6$:
The following reagents were mixed:
  (a) the solution of (MD$^{Vi}$Q) resin A described above, and
  (b) the solution of (MD'Q) resin B described above, in proportions corresponding to an A/B weight ratio of 50/50 on a dry basis.

The polydimethylvinylsiloxane resin C' described above was added to this mixture in an amount such that the A+B/C' weight ratio corresponded to 45/55 on a dry basis.

After removal of the xylene and toluene under vacuum at 100° C. and cooling to ambient temperature, 0.15 part by weight of ethynylcyclohexanol was added per 100 parts by weight of silicone polymers.

The modifier M$_6$ thus obtained had a viscosity on the order of 1,100 mPa.s at 25° C.

(7) Preparation of the modifier M$_7$ (comparative):
The following reagents were mixed:
  (a) the solution of (MD$^{Vi}$Q) resin A described above, and
  (b) the polydimethylvinylsiloxane oil C described above, in proportions corresponding to an A/C weight ratio of 70/30 on a dry basis.

The xylene was removed under vacuum at 100° C.

After the vacuum had been broken, 10 parts by weight of tetradecene per 90 parts by weight of silicone polymers were added at 100° C. to the very viscous mixture obtained ($2.5 \times 10^6$ mPa.s at 25° C.).

After cooling the mixture to ambient temperature, 0.15 part by weight of ethynylcyclohexanol was added per 100 parts of silicone polymers.

The modifier $M_7$ thus obtained had a viscosity on the order of 6,000 mPa.s at 25° C.

(8) Preparation of the modifier $M_8$ (comparative):

The following reagents were mixed:
(a) the solution of (MD'Q) resin B described above, and
(b) the polydimethylvinylsiloxane oil C described above, in proportions corresponding to a B/C weight ratio of 70/30 on a dry basis.

The toluene was removed under vacuum at 100° C.

After the vacuum had been broken, 10 parts by weight of tetradecene per 90 parts by weight of silicone polymers were added at 100° C. to the very viscous mixture obtained ($2.5 \times 10^6$ mPa.s at 25° C.).

After cooling the mixture to ambient temperature, 0.15 part by weight of ethynylcyclohexanol was added per 100 parts of silicone polymers.

The modifier $M_8$ thus obtained had a viscosity on the order of 6,300 mPa.s at 25° C.

(9) Preparation of the modifier $M_9$:

The following reagents were mixed:
(a) the solution of ($MD^{Vi}Q$) resin A described above, and
(b) the solution of (MD'Q) resin A described above, in proportions corresponding to an A/B weight ratio of 50/50 on a dry basis.

The polydimethylvinylsiloxane oil C described above was added to this mixture in an amount such that the A+B/C weight ratio corresponded to 70/30 on a dry basis.

The xylene and toluene were removed under vacuum at 100° C.

After the vacuum had been broken, 10 parts by weight of tetradecene per 90 parts by weight of silicone polymers were added at 100° C. to the very viscous mixture obtained ($>2.5 \times 10^6$ mPa.s at 25° C.).

After cooling the mixture of ambient temperature, 0.15 part by weight of ethynylcyclohexanol was added per 100 parts by weight of silicone polymers.

The modifier $M_9$ thus obtained had a viscosity on the order of 8,200 mpa.s at 25° C.

The modifiers $M_1$ to $M_9$, obtained above, were employed as follows to prepare coating baths used for providing, after curing in an oven, coatings exhibiting varying levels of release characteristics with different adhesives.

Preparation of coating baths:

The different constituents of the bath were admixed by successively introducing:
(a) (100−x) parts by weight of a polymethylvinylsiloxane oil (D) exhibiting a viscosity of 400 mPa.s at 25° C. and containing 1 mol % of SiVi functional groups in the form of $Me_2ViSiO_{1/2}$ and MeViSiO structural units and containing approximately 15% of its weight of ethynylcyclohexanol;
(b) x parts by weight of modifier $M_1$ to $M_9$;
(c) a polymethylhydrosiloxane oil (E) containing approximately 1.5 mol % of SiH functional groups, in sufficient quantity to provide a final molar ratio of total number of SiVi functional groups/total number of SiH functional groups on the order of 1.4; and
(d) 90 parts per million, expressed as platinum, of a platinum complex prepared from chloroplatinic acid and from 1,3-divinyl-1,1,3,3-tetramethyldisiloxane, as described in Example 1 of U. S. Pat. No. 3,814,730.

After vigorous homogenization, the mixtures were ready for coating.

Coating operation:

The apparatus employed was a Rotomec® pilot machine (marketed by Rotomec) equipped with a head without solvent with five rolls.

The support employed was glassine paper.
(i) either of Sibille® 9564 type, marketed by Sibille, or
(ii) of Kaemmerer® AV 100 type, marketed by Kaemmerer, the weight per unit area of which was on the order of 60 to 70 g/m².

The coating was performed at a paper travel speed of 150 m/min, which corresponded to a residence time of 2 seconds.

The coated substrates were removed immediately upon exiting the machine.

The amount of coating which was deposited was measured by X-ray fluorescence; it was on the order of 1 g/m² of substrate.

Behavior of the coated papers towards adhesives:

The coated papers obtained were placed in contact with the following adhesive tapes:

Tesa® 4651 (rubber)
Tesa® 4154 (rubber)
Tesa® 4970 (acrylic)

marketed by Beiersdorf, with, as the adhesive, Acronal® V 205 (acrylic) emulsion marketed by B.A.S.F.

The composites formed were deposited in a conditioned room (temperature of 23° C.±2° C.; humidity of 50% ±5).

The quality of the coatings was evaluated by measuring the force of adhesion (or of peeling), expressed in cN/2.5 cm according to the Finat test No. 10 using an Instron® tensiometer (marketed by Instron), at a peeling speed of 0.3 m/min.

The results of the measurements are reported in Tables 1 and 2.

Table 3 reports the change in the performance of the modifier $M_6$ during aging of the composites.

It was determined that the modifiers according to the present invention were well suited for general application.

Indeed, their performance in respect of acrylic adhesives was very clearly superior to that of the solid (in the dry state) resins containing SiH functional groups; and was on the same order of magnitude as those of the solid (in the dry state) resins containing SiVi functional groups; and in respect of rubber adhesives was superior to that of the solid (in the dry state) resins containing SiVi functional groups, and was on the same order of magnitude as those of the solid (in the dry state) resins containing SiH functional groups.

TABLE 1

% Modifier — Peel strength in cN/2.5 cm

Tesa 4651 (rubber) tape

| % Modifier | $M_1$ | $M_2$ | $M_3$ | $M_4$ | $M_5$ | $M_6$ | $M_7$ | $M_8$ | $M_9$ |
|---|---|---|---|---|---|---|---|---|---|
| 0 | 11 | 11 | 11 | 11 | 11 | 11 | 11 | 11 | 11 |
| 15 | — | — | — | 30 | 26 | 33 | 31 | 30 | 30 |
| 25 | 35 | 38 | 37 | — | — | — | 41 | 41 | 47 |
| 30 | — | — | — | 48 | 43 | 50 | — | — | — |
| 40 | — | — | — | — | — | — | 60 | 64 | 70 |
| 50 | 65 | 75 | 71 | 80 | 73 | 78 | — | — | — |
| 60 | — | — | — | — | — | — | 135 | 155 | 170 |
| 70 | — | — | — | 155 | 141 | 160 | — | — | — |
| 75 | 165 | 165 | 168 | — | — | — | 225 | 241 | 265 |
| 100 | 410 | 420 | — | — | — | — | — | — | — |

Tesa 4154 (rubber) tape

| % Modifier | $M_1$ | $M_2$ | $M_3$ | $M_4$ | $M_5$ | $M_6$ |
|---|---|---|---|---|---|---|
| 0 | 10 | 10 | 10 | 10 | 10 | 10 |
| 15 | — | — | — | 19 | 19 | 21 |
| 30 | 27 | 29 | 28 | — | — | — |
| 50 | 0 | — | — | 36 | 32 | 38 |
| 60 | 58 | 60 | 62 | 69 | 59 | 74 |
| 70 | — | — | — | 135 | 102 | 145 |
| 75 | 110 | 120 | 130 | — | — | — |
| 100 | 215 | 250 | — | — | — | — |

TABLE 2

% Modifier — Peel strength in cN/2.5 cm

Tesa 4970 (acrylic) tape

| % Modifier | $M_1$ | $M_2$ | $M_3$ | $M_4$ | $M_5$ | $M_6$ | $M_7$ | $M_8$ | $M_9$ |
|---|---|---|---|---|---|---|---|---|---|
| 0 | 15 | 15 | 15 | 15 | 15 | 15 | 15 | 15 | 15 |
| 15 | — | — | — | 28 | 23 | 26 | — | — | — |
| 25 | 38 | 38 | 36 | 38 | 29 | 36 | 52 | 28 | 57 |
| 40 | — | — | — | — | — | — | 95 | 36 | 90 |
| 50 | 71 | 42 | 69 | 83 | 45 | 75 | — | — | — |
| 60 | — | — | — | — | — | — | 200 | 60 | 215 |
| 70 | — | — | — | 202 | 66 | 185 | — | — | — |
| 75 | 200 | 63 | 190 | — | — | — | 315 | — | 300 |
| 100 | — | — | — | — | — | — | — | — | — |

Acronal V205 (acrylic) emulsion adhesive

| % Modifier | $M_1$ | $M_2$ | $M_3$ | $M_4$ | $M_5$ | $M_6$ |
|---|---|---|---|---|---|---|
| 0 | 16 | 16 | 16 | 16 | 16 | 16 |
| 25 | 50 | 22 | 44 | 54 | 23 | 56 |
| 40 | — | — | — | 100 | 30 | 103 |
| 50 | 125 | 45 | 108 | — | — | — |
| 60 | — | — | — | 195 | 63 | 195 |
| 70 | — | — | — | — | — | — |
| 75 | 325 | 102 | 282 | 350 | — | 395 |
| 100 | >600 | 150 | — | — | — | — |

TABLE 3

| Adhesive | % Modifier $M_6$ | 0 days | 5 days | 15 days | 30 days | 60 days |
|---|---|---|---|---|---|---|
| Tesa 4651 | 0 | 11 | 12 | 10 | 11 | 11 |
|  | 15 | 33 | 34 | 32 | 33 | 32 |
|  | 30 | 50 | 55 | 53 | 51 | 54 |
|  | 50 | 78 | 85 | 80 | 79 | 80 |
|  | 70 | 160 | 175 | 170 | 163 | 163 |
| Tesa 4154 | 0 | 0 | 12 | 13 | 16 | 21 |
|  | 15 | 21 | 28 | 33 | 37 | 41 |
|  | 30 | 38 | 45 | 51 | 62 | 70 |
|  | 50 | 74 | 79 | 88 | 92 | 97 |
|  | 70 | 145 | 150 | 160 | 168 | 173 |
| Tesa L4970 | 0 | 15 | 18 | 16 | 14 | 16 |
|  | 15 | 26 | 34 | 30 | 28 | 28 |
|  | 30 | 44 | 45 | 60 | 59 | 62 |
|  | 50 | 75 | 84 | 84 | 74 | 77 |
|  | 70 | 185 | 192 | 187 | 189 | 189 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An adhesion modifier composition which comprises:

(A) 30 to 70 parts by weight of at least one organopolysiloxane which is in solid form in the dry state, comprising at least two different siloxy structural units $R_3SiO_{1/2}$ (M unit) and $SiO_2$ (Q unit) and/or $RSiO_{3/2}$ (T unit), and optionally of $R_2SiO$ structural units (D unit), in which the radicals R, which may be identical or different, are each a $C_1$-$C_{18}$ alkyl or cycloalkyl radical, a $C_2$-$C_{20}$ alkenyl radical or a ($C_3$-$C_9$ alkenyl)oxyalkylene($C_2$-$C_4$) radical, at least 80 mol % of the radicals R being methyl radicals, and said organopolysiloxane containing at least 0.1 mol % of said identical or different alkenyl or alkenyloxyalkylene groups bonded to silicon atoms, with a ratio of the number of (M) units/number of (Q) and/or (T) units ranging from 0.6 to 1, and the number of optional (D) units, when present, ranging from 0.5 to 10 per 100 moles of organopolysiloxane;

(B) 70 to 30 parts by weight of at least one organopolysiloxane which is in solid form in the dry state, comprising at least two different siloxy structural units $R'_3SiO_{1/2}$ (M unit) and $SiO_2$ (Q unit) and/or $R'SiO_{3/2}$ (T unit), and optionally of $R'_2SiO$ structural units (D unit), in which the radicals R', which may be identical or different, are each a hydrogen atom or a radical R, at least 80 mol % of the radicals R' being methyl radicals, and said polysiloxane containing at least 0.5 mol % of hydrogen atoms bonded directly to silicon, with a ratio of the number of (M) units/number of (Q) and/or (T) units ranging from 0.6 to 1, the number of optional (D) units, when present, ranging from 0.5 to 10 per 100 moles of polysiloxane; with the proviso that said polysiloxanes (A) and (B) contain less than 10 mol % of silanol functional groups; and (C) at least one solvent or at least one diluent for the mixture of polysiloxanes (A) and (B).

2. The adhesion modifier as defined by claim 1 wherein said radicals R are vinyl, hexenyl, and/or allyloxypropyl groups, said organopolysiloxane (A) comprising a $MD^{Vi}Q$ organopolysiloxane wherein the vinyl groups are included in the (D) units, $MM^{Vi}Q$ wherein the vinyl groups are included in a proportion of the (M) units, $MD^{Vi}T$ wherein the vinyl groups are included in the (D) units, $MM^{Hexenyl}Q$ wherein the hexenyl groups are included in a proportion of the (M) units, or $MM^{Allyloxypropyl}Q$ wherein the allyloxypropyl groups are included in a proportion of (M) units.

3. The adhesion modifier as defined by claim 1, said organopolysiloxane (B) comprising an organopolysiloxane MD'Q wherein the hydrogen atoms bonded to silicon are included in the (D) units, MM'Q wherein M' is a proportion of the (M) units in which the hydrogen atoms are bonded to silicon, MM'DQ wherein the hydrogen atoms bonded to silicon are included in a proportion of the (M) units, or MDT' wherein T' is a proportion of the (T) units in which the hydrogen atoms are bonded to silicon.

4. The adhesion modifier as defined by claim 1, said solvent or diluent (C) comprising:

(1) an aromatic, saturated aliphatic or chlorinated hydrocarbon solvent, in an amount of from 50–70 parts by weight per 30–50 parts by weight of said organopolysiloxanes (A)+(B);

(2) a "reactive" solvent selected from among:

(a) liquid organopolysiloxanes in which the organic radicals are $C_1$–$C_{18}$ alkyl or cycloalkyl radicals, or $C_2$–$C_{20}$ alkenyl radicals, which have a ratio of the number of (M) units/number of (Q) and/or (T) units from 1 to 4 and optionally from 1 to 5 (D) units per 100 moles of liquid organopolysiloxane, and containing from 0.5 to 5 mol % of alkenyl functional groups bonded to silicon or of hydrogen atoms bonded to silicon, said organopolysiloxanes having a viscosity at 25° C. less than 100 mPa.s; and/or (b) fluid organopolysiloxane oils in which the organic radicals are $C_1$–$C_{18}$ alkyl or cycloalkyl radicals, $C_2$–$C_{20}$ alkenyl or ($C_3$–$C_9$ alkenyl)oxyalkylene($C_2$–$C_4$) radicals, said oils containing from 0.2 to 5 mol % of alkenyl or alkenyloxyalkylene functional groups bonded to silicon, at the end(s) of a polymer chain or along the polymer chain, and said oils having a viscosity lower than 200 mPa.s; and/or (c) olefinically unsaturated hydrocarbons, said reactive solvents being incorporated in an amount of from 20–50 parts by weight per 80–50 parts by weight of said organopolysiloxanes (A)+(B); or (3) aqueous emulsions of nonionic surface-active agents containing from 1% to 3 % by weight of surface-active agent, in an amount of from 40–70 parts by weight per 60–30 parts by weight of said organopolysiloxanes (A)+(B).

5. A curable release composition comprising:

(i) (100−x) parts by weight of a linear polydiorganosiloxane (D) blocked by triorganosiloxane endgroups, the organo radicals being $C_1$–$C_{18}$ alkyl or cycloalkyl radicals, $C_2$–$C_{20}$ alkenyl or ($C_3$–$C_9$ alkenyl)oxyalkylene($C_2$–$C_4$) radicals, at least 80 mol % of said radicals being methyl radicals, and at least 0.1 mol % of said organo radicals, which may be identical or different, being alkenyl or alkenyloxyalkylene radicals bonded directly to silicon;

(ii) x parts by weight of the adhesion modifier as defined by claim 2, with x ranging from 5 to 100;

(iii) a hydrosilylation inhibitor;

(iv) a linear polyorganohydrosiloxane crosslinking agent (E) containing from 1.6 to 0.9 mol % of hydrogen atoms bonded directly to silicon at the end(s) of the polymer chain and/or along the polymer chain, the organo radicals, which may be identical or different, being $C_1$–$C_{18}$ alkyl radicals, at least 80 mol % of said organo radicals being methyl radicals, and the amount of crosslinking agent being such that the ratio of the number of moles of SiH of the organopolysiloxane (B), from the reactive solvent (C) and from the crosslinking agent (E)/number of moles of Si-alkenyl of the organopolysiloxane (A), from the reactive solvent (C) and from the blocked linear polydiorganosiloxane (D) is greater than 1; and (v) a catalytically effective amount of a hydrosilylation catalyst.

6. The curable release composition as defined by claim 5, said blocked linear polydiorganosiloxane containing Si-alkenyl functional groups (D) exhibiting a viscosity of from about 150 to 1,000 mPa.s.

7. The curable release composition as defined by claim 5, said crosslinking agent containing SiH functional groups (E) exhibiting a viscosity of from about 5 to 150 mPa.s.

* * * * *